UNITED STATES PATENT OFFICE.

ARCHIBALD McINTYRE DE WITT, OF PITTSTON, PENNSYLVANIA.

IMPROVEMENT IN REMEDIES FOR COLDS, &c.

Specification forming part of Letters Patent No. 178,840, dated June 20, 1876; application filed April 17, 1876.

*To all whom it may concern:*

Be it known that I, A. McI. DE WITT, of Pittston, in the county of Luzerne and State of Pennsylvania, have invented certain new and useful Improvements in Medicine; and I do hereby declare the following to be a full, clear, and exact description of the invention, such as will enable others skilled in the art to which it pertains to make and use it.

My invention relates to medicines, and has as its object the cure of colds, coughs, and all diseases of the lungs, throat, bronchial tubes, and air-passages. With such an end in view, it consists of a compound having the following ingredients, substantially in the parts and proportions, to wit: Three ounces (liquid measure) sirup of brown sugar; two ounces sirup of honey; one and one-half ounce castor-oil; three-fourths ounce paregoric; three-fourths ounce spirits camphor.

With the above admixture I may use any flavoring-extract, as I desire to change or sweeten the taste. The result is a liquid, and can be placed in any suitable vessel for market or use.

The several ingredients may be mixed successively or conjointly, and thereafter placed in a receptacle and thoroughly stirred together, so that the resultant product shall hold in solution the several ingredients composing the same.

Having fully described my invention, what I claim as new, and desire to secure by Letters Patent, is—

A medicine for the cure of colds, bronchial affections, &c., consisting of spirits of camphor, paregoric, castor-oil, and the respective sirups of honey and brown sugar, in the parts and proportions substantially as herein described.

In testimony that I claim the foregoing I have hereunto set my hand this 15th day of April, 1876.

ARCHIBALD McINTYRE DE WITT.

Witnesses:
O. F. GAINES,
JOSEPH HILEMAN.